United States Patent [19]

Armand et al.

[11] 4,108,687
[45] Aug. 22, 1978

[54] PROCESS FOR IMPROVING THE HEAT RESISTANCE OF ZIRCONIUM AND ITS ALLOYS

[75] Inventors: Marcel Armand; Daniel Charquet, both of Albertville, France

[73] Assignee: Ugine Aciers, Paris, France

[21] Appl. No.: 746,950

[22] Filed: Dec. 2, 1976

[30] Foreign Application Priority Data

Dec. 12, 1975 [FR] France .................. 75 39403

[51] Int. Cl.² .............................................. C22F 1/18
[52] U.S. Cl. ........................................ 148/2; 148/3; 148/11.5 F; 148/133
[58] Field of Search ............... 148/2, 3, 11.5 F, 133

[56] References Cited

U.S. PATENT DOCUMENTS

| | | | |
|---|---|---|---|
| 2,772,964 | 12/1956 | Thomas | 75/177 |
| 2,894,866 | 7/1959 | Picklesimer | 148/11.5 F |
| 3,097,094 | 7/1963 | Rubenstein et al. | 75/177 |
| 3,148,055 | 9/1964 | Kass | 75/177 |
| 3,664,825 | 5/1972 | Bergqvist et al. | 75/177 |
| 3,782,924 | 1/1974 | Van Houten | 75/177 |
| 3,865,635 | 2/1975 | Hofvenstam et al. | 148/11.5 F |

*Primary Examiner*—W. Stallard
*Attorney, Agent, or Firm*—Dennison, Dennison, Meserole and Pollack

[57] ABSTRACT

A method for treating zirconium and zirconium alloys, in particular the zirconium alloys used in nuclear reactors which are water cooled, as a structural or casing material for fuels. The method consists in dissolving or maintaining a solid solution of the majority of carbon contained in these alloys by thermal or thermo-mechanical treatments carried out in the $\alpha + \beta$ range or if necessary in the $\beta$ range followed by a rolling in $\alpha$ phase if necessary. The products obtained have a highly improved mechanical resistance under heat, in particular with regard to resistance to creep; they are particularly suitable for constructing casing tubes for fuels in water cooled nuclear reactors having a better resistance to distortion in relation to time.

7 Claims, No Drawings

PROCESS FOR IMPROVING THE HEAT RESISTANCE OF ZIRCONIUM AND ITS ALLOYS

The invention generally concerns zirconium alloys and, in particular, those which are used as structural materials or as fuel cans in nuclear reactor cores. Generally speaking, this process makes it possible to give zirconium and it alloys a considerably improved resistance to creep. This improvement is particularly great at the temperature to which zirconium-based alloys are exposed in nuclear reactors containing heavy or light, boiling or pressurized water. The process can be applied much more generally to all technical fields in which zirconium-based alloys are used or can be used at relatively high tempertures, that is in the order of 200° to 600° C. In particular, this may be the case in certain chemical applications where alloyed or nonalloyed zirconium is used because of its resistance to corrosion at high temperatures and under great stresses.

Zirconium alloys which have been perfected for use in nuclear reactors comprise additional elements designed to strengthen their mechanical properties, and sometimes also to improve their resistance to corrosion, without increasing their thermal neutron-absorbing cross section too much. Zirconium's small absorbing cross section is, in fact, one of the essential reasons for its use in nuclear reactor cores. The alloy elements which are used can generaly be divided into two groups: the first group comprises those which mechanically strengthen the alloy by forming a solid solution in the $\alpha$ phase of the zirconium, that is the case with niobium, oxygen or tin, for example; the second group comprises elements which are hardly soluble in the $\alpha$ phase, and usually more soluble in the $\beta$ phase, and which form intermetallic compounds with zirconium. This is the case with Fe, Cr, Ni, Mo, Cu, V, etc. The elements in the second group are preferably chosen owing to their favorable action in resisting corrosion. Their action on the alloy's mechanical properties and, in particular, on its hot strength, are less perceptible than those of the elements in the first group.

The two alloys which are used most in nuclear reactors are Zircaloy 2 and Zircaloy 4 whose compositions are given below in percentage weight.

|  | Sn | Fe | Cr | Ni |
| --- | --- | --- | --- | --- |
| Zircaloy 2 | 1.2 to 1.7 | 0.07 to 0.24 | 0.05 to 0.15 | 0.03 to 0.08 |
| Zircaloy 4 | 1.2 to 1.7 | 0.18 to 0.24 | 0.07 to 0.13 | — |

Other alloys are also used to a lesser extent, such as the binaries Zr, Nb having 1 or 2.5% Nb and also certain more complex alloys such as the one called ozhenite 0.5 which contains small quantities of Nb, Fe, Ni and Sn and as the ternaries Zr Cr Fe, Zr Fe V, Zr Cu Fe, etc.

Numerous impurities have a unfavorable effect, either with regard to the absorbing cross section, or with regard to corrosion resistance. For this reason, users set maximum limits for the content of each of these impurities for use in nuclear reactors. Thus carbon, which is considered unfavorable for resistance to corrosion by water or steam at high temperatures beyond a certain content, is normally limited to values not exceeding 400 parts per million in the zircaloys. In fact, the quantity of carbon in solution in the $\alpha$ phase of zirconium at near to ambient temperatures is normally of the order of 100 to 150 ppm; if the total carbon content exceeds these values considerably, the excess precipitates in the form of carbide particles ZrC. As long as the total carbon content does not exceed 400 ppm by a great extent, this element has no perceptible influence on the mechanical properties of zirconium alloys in the form of finished products, when the normal transformation methods are used.

In a completely unexpected manner, the inventors have discovered the possibility of strengthening the mechanical properties of zirconium under heat to a considerable extent and, in particular, of strengthening its resistance to creep by increasing the quantity of carbon in a solid solution, in the $\alpha$ phase of the zirconium. Very interesting results were obtained in the case of zircaloys without exceeding the total carbon content limit which is 400 ppm. The same effect is obtained with any zirconium alloy having a largely $\alpha$ structure below 850° C. The addition of quantities of carbon in excess of 400 ppm produces an even greater strengthening of the mechanical properties. The process applies to nuclear zirconium alloys as well as to those used in the chemical industry. The latter often contain 2 to 3% hafnium which does not pose any problems for carrying out the method according to the invention. Finally, it is also possible to strengthen unalloyed zirconium, either containing hafnium or not, in the same way. New zirconium-carbon alloys can thus be obtained which have very high properties. To attain these results, only two conditions are necessary: in the first place, the carbon must be present in a suitable content level. As already mentioned, it is not necessary for this level to exceed the present fixed level for zircaloys, which is approximately 400 ppm, however the obtaining of alloys having even higher properties can be envisaged by considerably exceeding this limit. Secondly, the conditions selected for thermomechanical and/or thermal transformation of the zirconium alloys must be very different from the normal conditions since the latter do not allow sufficient quantities of carbon to be maintained in solution. Thus a classical transformation sequence of a Zircaloy 4 ingot comprises the following stages: (1) roughing of the cast ingot in homogeneous $\beta$ phase at an initial temperature generally higher than 1000° C and not exceeding 1100° C followed by a rapid cooling; (2) transformation of the semiproducts obtained by rolling or extrusion in $\alpha$ phase at a temperature below 780° C; and (3) end of cold transformation by rolling or drawing with intermediary or final tempering in $\alpha$ phase at a temperature below 780° C.

The inventors' investigations showed that from the first stage a fraction of the carbon precipitates in the form of ZrC. This phenomenon is probably due to the low solubility of carbon in the $\beta$ phase which must be of the order of 120 to 130 ppm at 1000° C and must hardly exceed 200 ppm at 1100° C. Temperatures above 1100° C are practically never used in the present state of the art, owing to the oxidability of zirconium alloys at high temperature. During the later treatments at temperatures below 780° C experience has shown that these coarse carbides did not redissolve in a notable manner and that the distribution of the carbon between the solid solution and the precipitated phase ZrC was practically the same in the finished product; this explains that the quantity of carbon in solid solution is generally below 150 ppm.

The process which forms the object of the invention applies to zirconium or zirconium-based alloys containing at least 150 ppm of carbon and preferably 200 to 1000 ppm. In certain cases, carbon contents can be envisaged which go right up to the limit of solubility of carbon in the α phase of zirconium which attains approximately 4000 ppm at 870° C (Y. G. Godin et al., Special Research Report: High Purity Metals and Alloys Fabrication Properties and Testing, edited by V. S. Emelyandy – A. I. Evstyukhd, translated from Russian 1967, Consultant Bureau, a division of Plenum Publishing Corporation).

After a stage of roughing the as cast ingots, carried out generally in the β range, the process comprises a thermal or thermo-mechanical carbon solubilization treatment, carried out in the α + β range. In the case of a Zircaloy 4 or a Zircaloy 2 containing 300 ppm of carbon, for example, the most favorable temperature range is between 830° and 950° C. During operation at temperatures above 950° C, the decrease in the quantity of α phase limits the possibilities of making the carbon into a solid solution and a heterogenization of the alloy is observed, which is unfavorable towards its resistance to corrosion. On the other hand, during operation below 830° C and above 780° C, that is in the case of Zircaloys 2 and 4 towards the lower part of the α + β range, the phase β quantity becomes very low and a coarsening of α gains, as well as a coalescence of the precipitated intermetallic phases containing Zr, Fe, Cr and possibly Ni, is observed, which is unfavorable to the mechanical properties. Furthermore, the rate of dissolution of the carbides becomes much slower. On the other hand, above 830° C, these unfavorable phenomena are not observed; the increase of the α grain is limited and the precipitates of inter-metallic phases maintain a sufficient fineness although they tend to localize in the vicinity of the α grain limits. If the treatment is purely thermal, it is generally necessary to maintain it for several hours, often being prolonged during 10 to 30 hours if the carbon is to be completely or almost completely dissolved. The larger the ZrC particles to be dissolved and the nearer the temperature to the lower limit of the range, the longer the duration of this treatment will be. The duration of the treatment can be shortened by combining and/or juxtaposing the thermal and mechanical effects. This is the case for example with consecutive rolling passes at temperatures between 830° and 950° C, with intermediary re-heating in the same range of temperatures.

These hot working actions can also be carried out in the same temperature range by forging of extrusion. This thermal or thermo-mechanical treatment carried out in the α + β range has the disadvantage of giving the product obtained insufficient resistance to corrosion, owing to the relatively heterogeneous distribution of the precipitated inter-metallic phases which preferably localize at the α grain limits. It has been found that it was possible to rectify this fault by having the metal sufficiently worked in the mono-phased α range. Such a treatment leads to a certain redistribution of the precipitates, and a very considerable improvement of the resistance to corrosion ensues. Experience has shown that good results are obtained if the product is made to undergo a total hot or cold reduction in section in the α range, attaining approximately two-thirds of the initial section. In the case of sheet metal, this corresponds to a ratio of 3 between the initial thickness and the final thickness over a constant width. Tests have shown that lower reduction ratios already lead to an improvement in the resistance to corrosion, but that this is not always adequate; on the other hand, reduction ratios above 3 give still better results.

It is relatively simple to provide a section-reducing phase such as the one which has just been described in the process for the transformation of zirconium or zirconium-based alloys, after the carbon solution treatment. This reduction may be effected by any classical process such as extrusion, rolling or drawing, or even a combination of these processes.

The non-exclusive example below describes a method for implementing the invention and allows the results obtained to be compared with those obtained by a classical transformation method:

EXAMPLE

A Zircaloy 4 ingot with a 500 mm diameter, having the following ponderal composition, was produced by methods known in the art.

| Sn | Fe | Cr | C | Si | O | H | N |
|---|---|---|---|---|---|---|---|
| 1.45% | 0.20% | 0.11% | 232 ppm | 78 ppm | 1200 ppm | 10 ppm | 23 ppm |

This ingot was then transformed by forging at 1030° C; that is, in the α phase, into squared bars with 100 mm sides. These bars were then tempered for 1 hour at 1050° C then water quenched. From that moment, two transformation sequences were used: sequence 1, classical, and sequence 2 in accordance with the invention.

Sequence 1 comprises forging at 750° C in the α range in order to transform the 100 × 100 square into 12 mm-thick flat bars, then rolling at the same temperature to a thickness of 6 mm.

Sequence 2 comprised a pre-heating of about 4 hours at 850° C followed by forging to 12 mm thickness at the same temperature, then, after re-heating for about 2 hours at 850° C, a rolling at the same temperature to 6 mm thickness in approximately 6 passes with re-heating between each pass for approximately 15 minutes at 850° C.

The 6 mm thick flat bars obtained by the two sequences were then cold rolled to a final thickness of 2 mm, with intermediary tempering at 3.5 mm thickness and a final tempering, both effected for 3 hours at 650° C.

Microscopic examination showed that the size of the grains was the same in both cases. The inter-metallic phase precipitates, distributed in a homogeneous manner, were slightly larger in the case of the sheets obtained in the classical manner, in accordance with sequence 1. In the case of sheets obtained in accordance with sequence 2, the distribution of the inter-metallic precipitates was slightly less homogeneous than in the case of sequence 1, but the reduction in section by cold rolling from 6 to 2 mm had lead to a sufficient dispersion however to give a good resistance to corrosion.

Finally, large precipitates of more or less broken carbides were observed on the same sheets obtained in accordance with sequence 1, which were absent in the case of the sheets obtained in accordance with sequence 2 according to the invention. This therefore illustrated that the thermo-mechanical treatments effected at 850° C had dissolved the carbides which were initially present in the 100 squares after forging in β and tempering.

Two of the most important mechanical properties at 400° C were then measured on the 2 mm sheets tempered at 650° C. The table below gives the results obtained:

| MECHANICAL PROPERTIES AT 400° C | | | | |
|---|---|---|---|---|
| | Yield strength in MPa | | Creep elongation in 100h. under stress of 98.07 MPa % | |
| | longitudinal | transverse | longitudinal | transverse |
| Classical range Sequence 1 | 129.4 | 122.6 | 0.647 | 0.685 |
| Range according to invention Sequence 2 | 139.25 | 153.96 | 0.154 | 0.096 |

These results show that the thermo-mechanical treatment effected in accordance with the invention, which results in the ZrC precipitates being dissolved, leads to an increase in the strength of 7 to 20% and an even greater improvement in the resistance to creep, the creep rate being 4 to 7 times lower.

As stated above, the solution-forming phase of the process according to the invention can comprise the purely thermal or thermo-mechanical treatments as in the above example; the increase in the treatment temperature in the interior of the range which has been defined enables the treatment time to be decreased or the contents of dissolved carbon to be increased, all things being equal.

In the same way, in order to make it easier to dissolve the carbides formed, the reduction of their individual size can be envisaged. It has, in fact, been observed that the precipitation of these carbides could be initiated by the presence of certain insoluble elements in the zirconium or zirconium alloys, such as phosphorus and silicon. These elements are generally present in the form of impurities having contents in the order of a few ppm to some dozens of ppm. If their content is too low, that is, in the order of about 10 ppm or less for each one, the carbon tends to precipitate in the form of a small number of carbide particles with large dimensions. Re-dissolving these carbides is a relatively long and difficult process. If on the other hand the P and/or Si content is a little higher: some dozen ppm for one or the other or both, the precipitation of the carbon tends to take place in the form of much more numerous and therefore smaller particles.

It is possible, in particular, to formulate new zirconium-based alloys having analogue compositions to the Zircaloys 2 and 4, but with carbon contents exceeding the limits fixed by the nuclear standards of the Zircaloys 2 and 4. Such alloys have even higher mechanical properties, which are particularly interesting for use under heat.

The process which forms the object of the invention is applied particularly well to the manufacture of canning tubes for pressurized water nuclear reactors, in which an alloy with an increased resistance to creep enables smaller thicknesses to be used or even avoids recourse to internal pressurization of the tubes which is not without disadvantages. The process can also be applied to other zirconium-based alloys than the Zircaloys, insofar as they have a bi-phase $\alpha + \beta$ range comprising a zone situated in the temperature interval between 830° and 950° C inclusive. This is the case in a certain number of experimental alloys belonging to the ternary systems Zr Cr Fe, Zr Fe V, Zr Fe Cu. It is also the case of the alloy known under the name of ozhenite 0.5. For all these alloys, a whole range of mechanical properties, resistance to creep being the better if the quantity of dissolved carbon is higher, can be obtained by varying the carbon content between 150 ppm and a maximum value of the order of 1000 ppm attaining 4000 ppm in certain cases. The thermal or thermomechanical treatment must also be adapted in length and duration to the quantities of carbon which must be dissolved, and also to the size of the carbide particles which are formed during the roughing of the ingots at high temperatures.

As previously stated, the process can also be applied to zirconium alloys containing hafnium, which are usually used for non-nuclear uses, owing to their low price. These alloys generally have a hafnium content below or equal to 3% Hf. In fact, the Hf content does not have a notable influence on the conditions for implementing the invention, and the results obtained with alloys containing Hf are near to those obtained with the same alloys not containing Hf. The process can also be applied to non-alloyed zirconium, whether it has hafnium added or not, in similar temperature conditions. Here also it is possible to introduce carbon quantities higher than those which are usually considered acceptable. By exceeding the normal contents of some 100 ppm and by attaining contents near to 1000 ppm, possibly reaching 4000 ppm, real zirconium-carbon alloys can thus be obtained with very high mechanical properties under heat. Such alloys can have extensive application in the chemical industry in the case of processes requiring high temperatures and pressures and for which the use of sandwich structures often has serious disadvantages.

The replacement of the thermal or thermo-mechanical treatment for dissolving carbon in the $\alpha + \beta$ range by a treatment in the $\beta$ range at a temperature where the solubility limit of carbon is higher than or approximately equal to the carbon content of the zirconium or the zirconium alloy can also be envisaged. In order to be effective, such a treatment must be carried out at a temperature above 1100° C and possible attaining 1200° C or more if quantities of carbon in the order of 300 to 400 ppm or more are to be dissolved. This treatment has the disadvantage of exposing the metal to a rapid oxidation at high temperatures, Further, a very rapid cooling is necessary if the precipitation of the carbides is to be avoided. In the case of carbide precipitates having the time to form, however, their dimensions are small and a thermal or thermo-mechanical treatment of very short duration in the $\alpha + \beta$ range above 830° C is sufficient to re-dissolve them.

We claim:

1. In a process for improving the mechanical and corrosion resistance properties under heat of zirconium and zirconium alloys including up to about 3% hafnium by weight as an impurity and alloying elements selected from the group consisting of Fe, Cr, Ni, Mo, Cu, V, Sn and Nb, and wherein the zirconium or zirconium alloys comprise a significant portion of $\alpha$ phase within the temperature range of 830° to 950° C and which contain between about 150 and 400 ppm of carbon to strengthen the resistance to creep, the improvement comprising: casting the zirconium and zirconium alloys into ingots; effecting carbon solubilization by thermal or themomechanical treatment of said zirconium and zirconium alloys within said temperature range during transformation of the ingot into an intermediate product shape wherein a significant portion of $\alpha$ phase is present to solubilize at least a part of the carbon; subsequently transforming the intermediate product shape to a finished product shape by carrying out a further reduction of the intermediate product in the $\alpha$ temperature range to effect ingot dimension reduction of at least about 50%; and annealing the finished product in the α temperature range.

2. A process as defined in claim 1, wherein at least one of said thermal solubilization treatments is carried out for of a total duration of from 2 to 30 hours.

3. A process as defined in claim 1, wherein from 10 to 100 ppm of phosphorus is introduced into the zirconium or zirconium alloy.

4. A process as defined in claim 1, wherein from 10 to 100 ppm of silicon is introduced into the zirconium or zirconium alloy.

5. In a process for improving the mechanical properties under heat of zirconium with or without hafnium and zirconium alloys, each of which contain between about 150 and 400 ppm of carbon, to strengthen the resistance to creep, the improvement comprising: casting the material into ingots; effecting carbon solubilization by thermal or thermo-mechanical treatment during transformation of the ingot in the solid state into an intermediate product shape at a temperature in excess of 1100° C to solubilize at least part of the carbon; rapidly cooling the material to below 950° C; and subsequently carrying out an additional thermal or thermo-mechanical treatment at a temperature of not greater than 950° C to produce a finished product.

6. A process as defined in claim 5, wherein from 10 to 100 ppm of silicon is introduced into the zirconium or zirconium alloy.

7. A process as defined in claim 5, wherein from 10 to 100 ppm of phosphorus is introduced into the zirconium or zirconium alloy.

* * * * *